G. JOHNSTON.
Condenser.
No. 8,969.
Patented May 25, 1852.
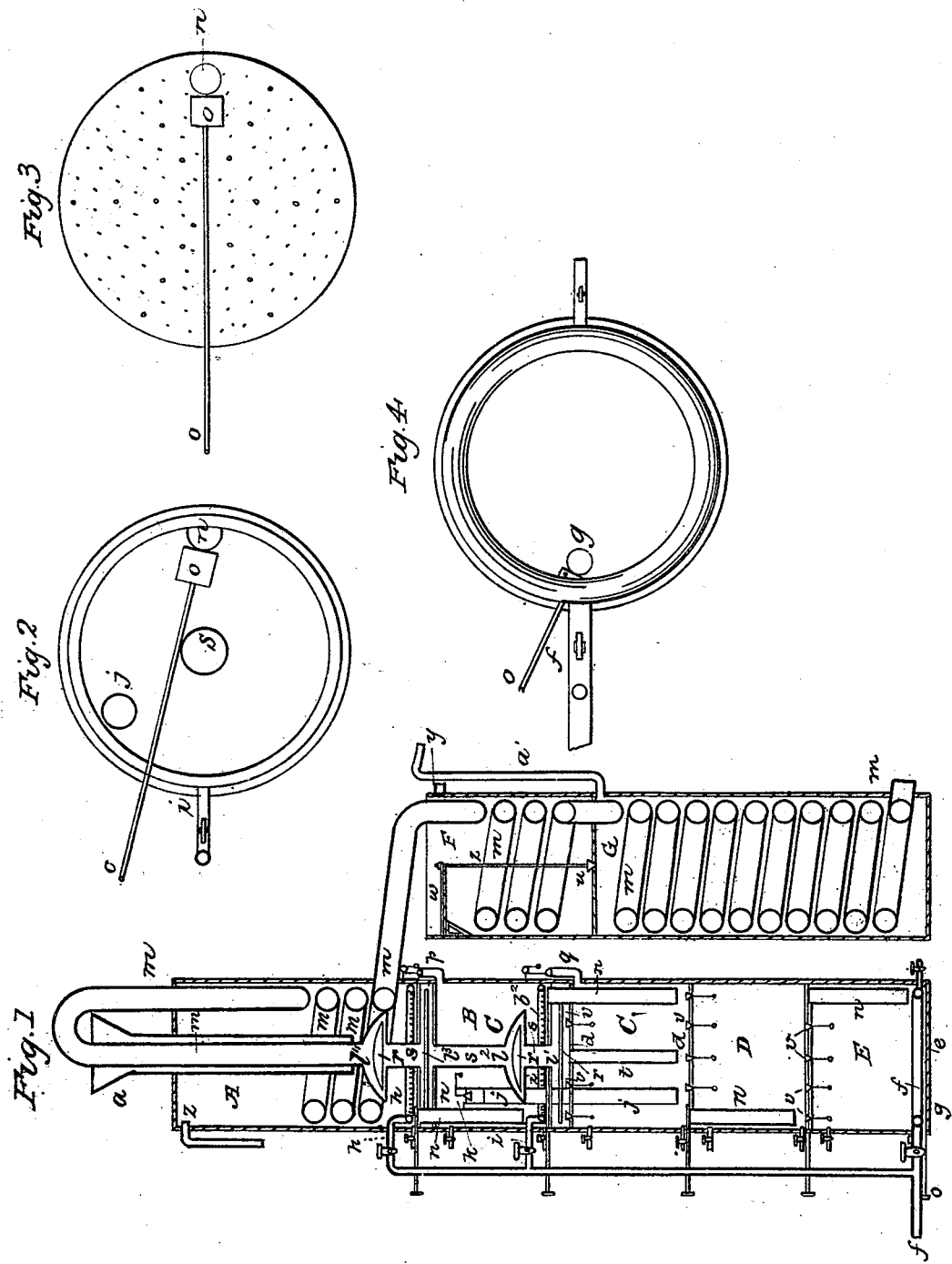

UNITED STATES PATENT OFFICE.

GEORGE JOHNSTON, OF FARMINGTON, IOWA.

IMPROVEMENT IN WORM-TUBS OF STILLS.

Specification forming part of Letters Patent No. 8,969, dated May 25, 1852.

*To all whom it may concern:*

Be it known that I, GEORGE JOHNSTON, of the town of Farmington, county of Van Buren, and State of Iowa, have invented a new and Improved Manner of Constructing Stills for Distilling Spirituous Liquors by a Single Process; and I do hereby declare that the following is a full and exact description of the same, reference being had to the accompanying drawings, making part of this specification.

Figure 1 in the accompanying drawings represents a vertical section, through the center, of a still combining my improvements. Fig. 2 is a plan of the partition $b^2$ in Fig. 1; Fig. 3, a plan of the partitions $d$ in Fig. 1, and Fig. 4 is a plan of the bottom $e$ in Fig. 1.

Like parts in the several figures are designated by the same letters.

My invention consists in a still having the following parts, viz: The chamber A, which I call the "wash-charger," the chamber B, called the "heating-chamber," together with the vaporizing-chambers C D E, the chamber B communicating with the upper vaporizing-chamber, C, by a tube, $j$, and valve $k$, the several small rectifying-chambers $l'\, l^2\, l^3\, l^4$ connecting with the vaporizing-chamber C and leading to the still-worm $m$, the refrigeratory divided into two chambers, F and G, the upper one, F, called the "hot-water chamber," and the lower one, G, called the "cold-water chamber," and communicating with the hot-water chamber by a valve, $u$, made to open at a determinate temperature. The wash-charger A receives the wash or beer, which runs into it by the funnel $a$ in a constant stream. The overflow-pipe $z$ draws off the superabundant wash if it flows too fast into the wash-charger A. Within the wash-charger is the small rectifying-chamber $l^4$ and a portion of the still-worm $m$, which passes twice through and coils several times within it. The use of the chamber A is especially to complete the process of rectifying the alcoholic vapor as it ascends into the still-worm, and the wash within said chamber A is but partially heated, when a portion is drawn off into the heating-chamber B sufficient to about half fill it. Within the chamber B the wash is heated to the boiling-point by means of the steam and vapors rising through the rectifying-chambers $l'\, l^2\, l^3$ and passages $s$. The process of vaporizing may also be carried on to any extent within this chamber, and the steam and vapors pass off through the tube $j$ (the valve $k$ opening by a light pressure from above) into the vaporizing-chamber C, where they unite with the steam and vapors produced in the regular vaporizing-chambers C D E. By this arrangement of the heating-chamber B and the tube $j$, leading to the vaporizing-chamber C, all the alcoholic vapor evolved in the process of heating the wash in said chamber B is saved. The chambers A and B are each provided with a steam-pipe, $h$ and $i$, which coil once upon the bottoms of said chambers, and are perforated with small holes on the inside of the coils for admitting steam to stir up the sediment of the wash. When the wash in the chamber B has reached the boiling-point, it is drawn into the first vaporizing-chamber, C, and another supply drawn into the chamber B. The wash in the chamber C is partially deprived of its alcoholic vapor, when it is drawn into the chamber D to be subjected to a further vaporizing process; thence drawn into the lower vaporizing-chamber, E, where, being subjected to the first action of the steam introduced through the pipe $f$, it is completely deprived of its remaining alcoholic vapor, and finally drawn away through the orifice $g$. As successive portions of the spent wash are drawn away, other portions are admitted from the chamber above, and each chamber is always again supplied from the chamber above it when its own supply is drawn off, a constant transfer of portions of the wash thus being made from one chamber to another by the tubes $n$, which are opened and closed by the gates $o$. The chambers B and C are provided with safety-valves $p$ and $q$, for admitting air from without to prevent collapse of the still should the steam in these chambers become condensed by the sudden admission of cold wash. The steam, with the accompanying vapors, passes up through the successive sets of valves and small perforations in the partitions $d$ into the successive vaporizing-chambers E D C, till it reaches the small rectifying-chamber $l'$, thence through the chambers $l^2\, l^3\, l^4$ and their connecting-passages $s$, and, striking the retarding-plates $r\, r\, r\, r$ and the tops of the rectifying-chambers $l'\, l^2\, l^3\, l^4$, which are surrounded by the cold wash, the watery vapor and essential oils, condensing at a higher temperature than the alcoholic vapor, are here condensed and flow back into the chamber C by the passages s and tube t, leaving the alcoholic vapor sufficiently rectified, and only now to be condensed in the still-worm m to render the process complete. The upper chamber, F, of the refrigeratory or worm-tub is filled with water, which extracts nearly all the heat from the condensing vapor within the worm as it passes through said chamber F. In this chamber there is a valve, u, closing the orifice leading to the chamber G. This valve is connected by a rod, x, with a plate, w, composed of two laminæ of different metals, (or other substances,) having different degrees of expansibility, firmly united at their contiguous sides, so that when heat is applied to them the lower will expand more than the upper lamina, and consequently the plate will be bent upward and open the valve u. The lower lamina may be of brass and the upper of iron. The plate w is fixed to the rod x by a screw, which can be so adjusted as to cause the valve u to rise when the water in the chamber F reaches a given temperature, and admit the colder water from the chamber G below for a sufficient length of time to reduce the temperature of the water in F to such a degree as to cause it, by its action on the plate w, to close the said valve u again. The said chamber G is supplied with water in the usual manner at its bottom from a sufficient height to fill the chamber F when the valve u is open and cause the water to flow therefrom through the waste-pipe y, and when the said valve u is closed to cause the water to flow from the chamber G through the elevated waste-pipe a'.

What I claim as my invention, and desire to secure by Letters Patent, is—

The division of the worm-tub into an upper and a lower compartment, F and G, and connecting them to each other by a valve, u, so arranged that it will be operated by the influence of the temperature of the water in the upper compartment, F, for the purpose of enabling the distiller to keep the water in the said upper compartment at any elevated temperature that may be required for use in preparing the distiller's beer or fermented wash, or for other purposes in the distillery.

The above specification of my new and improved manner of constructing stills for distilling spirituous liquors signed this 24th day of May, 1851.

GEORGE JOHNSTON.

Witnesses:
   Z. C. ROBBINS,
   J. S. BROWN.